(12) United States Patent
Rehder et al.

(10) Patent No.: US 9,191,218 B1
(45) Date of Patent: Nov. 17, 2015

(54) PARTICIPANT REPUTATION IN A GROUP COMMUNICATION ENVIRONMENT

(75) Inventors: Matt Rehder, Seattle, WA (US); Richard Lotz, Seattle, WA (US); Peter Hill, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 157 days.

(21) Appl. No.: 13/107,066

(22) Filed: May 13, 2011

(51) Int. Cl.
*H04L 12/18* (2006.01)
*H04L 29/08* (2006.01)

(52) U.S. Cl.
CPC ............ *H04L 12/1822* (2013.01); *H04L 67/22* (2013.01)

(58) Field of Classification Search
CPC ..... H04L 41/22; H04L 67/22; H04L 12/1822; H04L 29/06176
USPC ............................. 379/202.01, 158; 709/204
See application file for complete search history.

(56) References Cited

U.S. PATENT DOCUMENTS

| | | | |
|---|---|---|---|
| 2003/0001890 A1* | 1/2003 | Brin | 345/753 |
| 2004/0047461 A1* | 3/2004 | Weisman et al. | 379/202.01 |
| 2006/0034463 A1* | 2/2006 | Tillotson | 381/1 |
| 2009/0006608 A1* | 1/2009 | Gupta et al. | 709/224 |
| 2009/0049029 A1* | 2/2009 | Choi et al. | 707/5 |
| 2009/0052645 A1* | 2/2009 | Bansal et al. | 379/202.01 |
| 2009/0165128 A1* | 6/2009 | McNally et al. | 726/21 |
| 2009/0220064 A1* | 9/2009 | Gorti et al. | 379/202.01 |

* cited by examiner

*Primary Examiner* — Ahmad F Matar
*Assistant Examiner* — Jirapon Intavong
(74) *Attorney, Agent, or Firm* — Thomas | Horstemeyer, LLP

(57) ABSTRACT

Methods, systems and computer program products are provided. Methods for controlling a multiple participant communication session include identifying a current speaker to other ones of a plurality of participants in the multiple participant communication session. A speaker rating input is received from at least one of the participants that corresponds to the helpfulness of the current speaker. A speaker reputation score is generated responsive to receiving the speaker rating input. A reputation-based speaker hierarchy is generated for the participants using the speaker reputation score. A contribution signal strength corresponding to ones of the participants is regulated to be positively correlated with the reputation-based speaker hierarchy.

33 Claims, 8 Drawing Sheets

| | 402 | 404 | 406A | 406B | 406C | 406D | 406E |
|---|---|---|---|---|---|---|---|
| | Participant | Reputation Score | Signal Strength if A is Active | Signal Strength if B is Active | Signal Strength if C is Active | Signal Strength if D is Active | Signal Strength if E is Active |
| | A | 3 | 1.0 | 1.0 | 1.0 | 0.5 | 1.0 |
| | B | -1 | 0.5 | 0.5 | 0.5 | 0.5 | 1.0 |
| | C | 1 | 0.5 | 1.0 | 1.0 | 0.5 | 1.0 |
| | D | 4 | 1.0 | 1.0 | 1.0 | 1.0 | 1.0 |
| | E | NA | 1.0 | 1.0 | 1.0 | 1.0 | 1.0 |

PARTICIPANT REPUTATION IN A GROUP COMMUNICATION ENVIRONMENT

BACKGROUND

Electronic communications have become widely accepted for communicating among people and/or groups of people. Such electronic communications may include real-time communications involving more than two participants such as conference calls. In some cases, only one speaker may be broadcast to the group of participants, thus effectively muting other participants who may be prepared to provide contributions to the discussion. In some cases, the person speaking may take priority over other potential speakers who may be precluded from contributing to the discussion. In other cases, a new speaker is given priority over an existing speaker, thus an interrupting speaker may take priority over the current speaker. Unfortunately, it may in some cases be difficult for participants with helpful discussion content to be heard by other ones of the participants.

DETAILED DESCRIPTION

Figure 1:
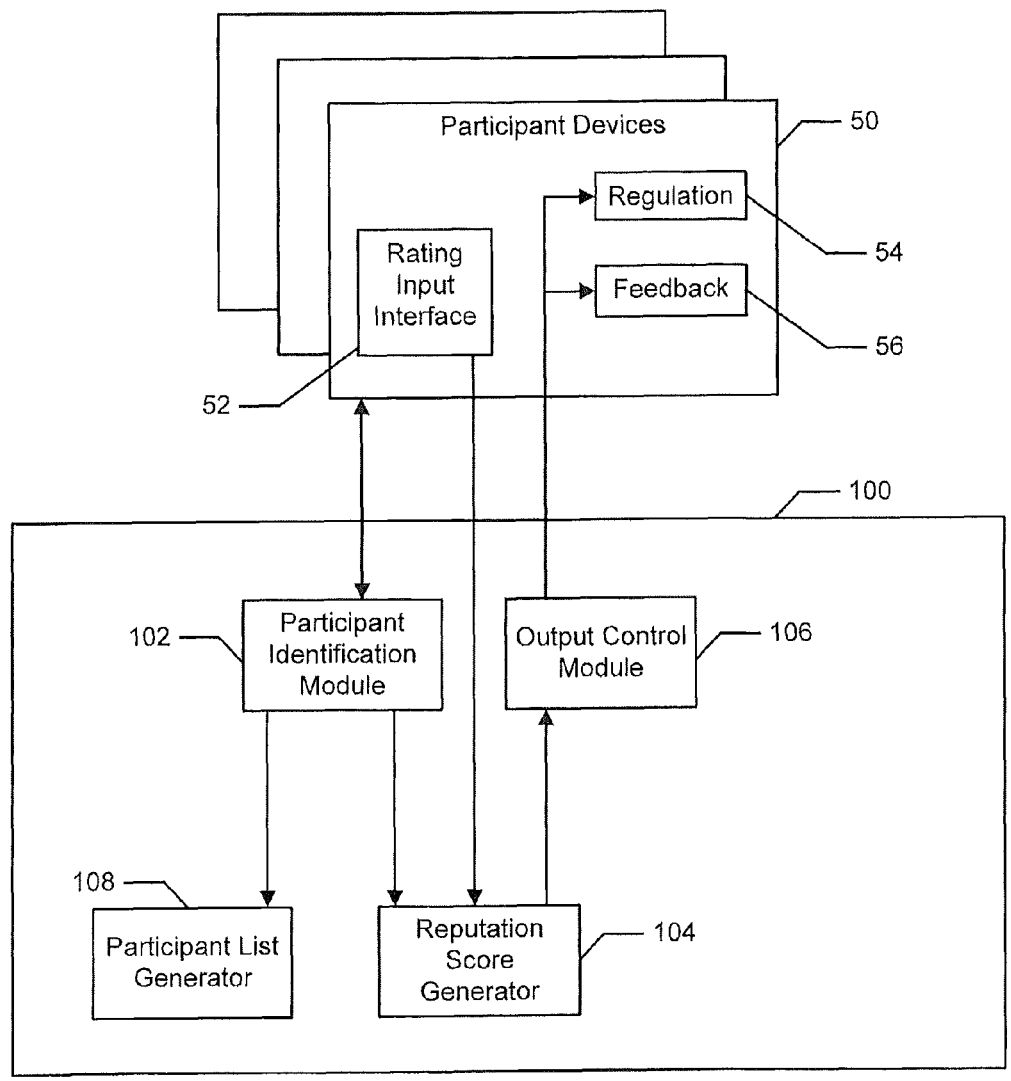
FIG. 1 is a block diagram of systems, devices, methods and computer program products for rating participants in a multiple participant communication session, according to various embodiments described herein.

Various embodiments described herein analyze inputs from participants in a communication session regarding the usefulness of communications provided by other ones of the participants. A non-limiting example of a communication session according to some embodiments described herein includes a conference call that facilitates communication between multiple participants at multiple locations. In the context of a conference call, certain participants may provide particularly helpful and/or particularly unhelpful contributions to the call. For example, in circumstances where a participant becomes fixated on a less related topic or is dominating the conversation with redundant and/or unhelpful communications, other participants may become less engaged and/or frustrated. In some cases, a particularly helpful participant may be unable to convey topically relevant information because a less helpful participant is dominating the conference call and/or interrupting the helpful participant.

According to some embodiments herein, conference call participants may provide rating information regarding the helpfulness of the contributions of other participants. The rating information may be used to regulate the access that different ones of the participants have to provide additional inputs to the call. For example, a reputation score, which may include one or more values indicating a participant's overall helpfulness, may be determined for each of the participants based on the rating information provided by other participants. Relative reputation score values may provide a basis for prioritizing communications from one participant relative to another participant. For example, a very unhelpful participant may have a low reputation score and thus may be regulated to have reduced ability to interrupt, interject and/or dominate a conference call.

Regulating access to the conference call may be achieved by regulating the contribution signal strength in a variety of ways. As used herein, the contribution signal strength may refer to a participant's access, ability and/or capability to provide additional communications to other participants. In the context of a conference call, the contribution signal strength may be determined as an audio volume of the participant's communications. In this manner, the audio volume of a low reputation score participant may be reduced correspondingly based on the low reputation score. Alternatively, the contribution signal strength may be determined as an access time or lack thereof. For example, a low reputation score participant may be temporarily muted for a given time interval. In some embodiments, if additional rating inputs that further reduce the reputation score of the participant are received, the muting time may be increased to another greater time interval during which the participant has a curtailed capacity to interrupt, interject and/or dominate the conference call.

In contrast, the reputation scores of particularly helpful participants may provide additional priority for communications from that participant. In such instances, a participant having a high reputation score may be more difficult to interrupt by other participants having lower reputation scores. In this regard, a reputation score hierarchy may be generated that determines a relative prioritization among all of the participants. The hierarchy may be used to establish contribution signal strength values that regulate participation in the conference call based on rating inputs provided by the participants thereof.

Overall Architecture

Reference is now made to FIG. 1, which is a block diagram of systems, devices, methods and computer program products for rating participants in a multiple participant communication session, according to various embodiments described herein. A system 100 that may be used to rate participants in a multiple participant communication session may include and/or be incorporated into a conference call system, a video conference system, a text-based communication environment (e.g., text messaging, instant messaging, etc.), a virtual environment, a gaming environment and/or community and/or a communication client application operating on at least one processor, among others. The system 100 may include an active participant identification module 102 that is operable to determine an identification of the currently communicating (active) participant. In some embodiments, the identification of the active participant may be transmitted to other participants via their respective participant devices 50.

A participant device 50 may include a rating input interface 52 that other participants may use to provide a helpfulness rating of the active participant. In some embodiments, the helpfulness rating may be expressed as discrete rating data that indicates that the active participant is either helpful or unhelpful. For example, a standard keypad on a telephone may provide the rating input interface such that a participant may press a first key to provide a favorable or helpful rating and a second key to provide an unfavorable or unhelpful rating. In some embodiments, the keypad could be used to input a numerical rating (e.g., a helpfulness rating on a scale from 0 to 9.)

In some embodiments, a participant device 50 may be a smart phone, tablet, portable and/or fixed computing device that may provide a graphical rating input interface 52. In this regard, the rating data may be provided at a higher resolution, such as, for example, as a value on a graduated scale. The values on the graduated scale may be delineated alphabetically, numerically, symbolically and/or by color among others.

The participant device 50 may include a regulation function 54 that may receive regulation data and/or signals that regulate a communication output from the participant device 50. The regulation function 54 may include software and/or hardware that regulates one or more operating characteristics of the participant device 50 and/or that maintains data corresponding to one or more characteristics of the participant device 50.

The participant device 50 may include a feedback function 56 that is operative to provide feedback data to the participant regarding rating data or inputs received about that participant and/or a reputation score that is generated for that participant. The feedback function 56 may include software and/or hardware that provide(s) audible and/or visual signals to the participant.

Some embodiments provide a participant reputation score generator 104 that is operable to generate participant reputation scores of participants in the communication session responsive to rating data provided by other participants via their respective rating input interfaces 52. The reputation score generator 104 may associate the generated reputation scores with respective participants using identification data provided by the participant identification module 102.

A participant output control module 106 may regulate relative communication output from ones of the participants based on the respective participant reputation scores. In some embodiments, the participant output control module 106 may establish a reputation hierarchy that ranks the relative reputations of the participants. Once the reputation hierarchy is established, a participant having a lower rank (reputation score) may have a reduced contribution signal strength relative to a participant having a higher ranking (reputation score). For example, the lower ranked participant may be muted for a given period of time to reduce interruptions of a higher ranked participant. Some embodiments provide that if the lower ranked participant continues to receive unfavorable ratings, the time interval for muting may be increased. Some embodiments provide that the relative output volume level of the participants may be adjusted corresponding to the reputation hierarchy. For example, when an active participant is communicating, the volume of a lower ranked participant may be adjusted to be lower than that of the active participant based on the active participant's higher ranking. In this manner, a disruption by lower ranked (less helpful participants may be reduced.

In some embodiments, the participant output control module 106 is operable to regulate relative communication outputs by establishing a threshold participant reputation score and adjusting relative contribution signal strengths for the participants corresponding to the reputations scores relative to the threshold participant reputation score. For example, if the threshold is established at a median value of the range of possible scores, the volume of participants having reputation scores below that median value may be reduced.

Although primarily discussed thus far as voice-based communications, embodiments disclosed herein are not so limited. For example, the communication session may be a text-based communication environment, such as, for example, a chat room, web log and/or email environment. In this regard, the relative communication outputs may be regulated by modifying an appearance of the text and/or by the delivery options. For example, in a chat room, text from a participant having a high reputation score may appear in a larger and/or different font, a different color and/or a different shade relative to the text from other lower ranked participants.

In some embodiments, a participant identifier may be determined and/or assigned when the communication session is initiated and may be session specific. As such, reputation scores associated with that session specific identifier may be limited to the duration of that session. Some embodiments provide that a participant identifier is persistent and thus unique to the specific participant. In this regard, a participant reputation score that is associated with the participant identifier may also be persistent. As such, a reputation score determined in a communication session may be based, in part, on a previously determined participant reputation score that was generated responsive to at least one previously occurring communication session. In this regard, a participant reputation score may include a historical component that recognizes the participant's helpfulness (or lack thereof) in previous communication sessions.

Some embodiments provide that the participant reputation scores include a statistical component having a value that is weighted with recent data. In this manner, a participant having a previously established lower reputation score that later in a communication session begins to provide helpful communications may realize a reputation score that changes quickly in response to recent favorable ratings from other participants. In this regard, the recent rating data may include a greater statistical significance than earlier rating data. Some embodiments provide that the statistical component may be expressed using a moving average that is calculated using a given quantity of rating data points and/or rating data inputs that are received during a given time interval. The moving average may include a linear moving average wherein rating data inputs are given equal weight and/or an exponential moving average wherein recently received rating data inputs are weighted more heavily than earlier received rating data inputs.

Participant reputation scores may include one or more context specific components. In some embodiments, context specific components may include tags that designate a particular context in which a participant has a favorable (or unfavorable) reputation score. For example, a participant may have a tag corresponding to an area of expertise. The reputation score may include different values corresponding to different tags such that the reputation hierarchy may be dynamically adjusted to correspond to specific content in the communication session. For example, a first portion of the communication session may include content related to a subject in which a particular participant has a low reputation score component. In this case, the reputation hierarchy may rank that participant lower than other ones of the participants. Another portion of the communication session may include different content that is related to a subject in which the participant has a high reputation score component. In this regard, the reputation hierarchy may rank the participant higher than other participants.

In some embodiments, the communication session may be associated with specific tags that indicate the planned content of the session. In this regard, the content of the communication session may activate different ones of the tags responsive thereto and the participant output control module 106 may dynamically regulate the relative communication output from the participants based on the participant reputation scores and changes in the communication session context. Additionally, a participant list generator 108 may be operable to identify communication participants to be invited to a planned communication session based on one or more tags in the participant reputation score. Some embodiments provide that prospective communication participants that are identified to be invited may include participants that are associated with other communication participants and/or have no previous association with the communication participants. In this regard, prospective participants realized to include specific context-related knowledge and/or expertise may be identified and invited regardless of previous association.

Figure 2:
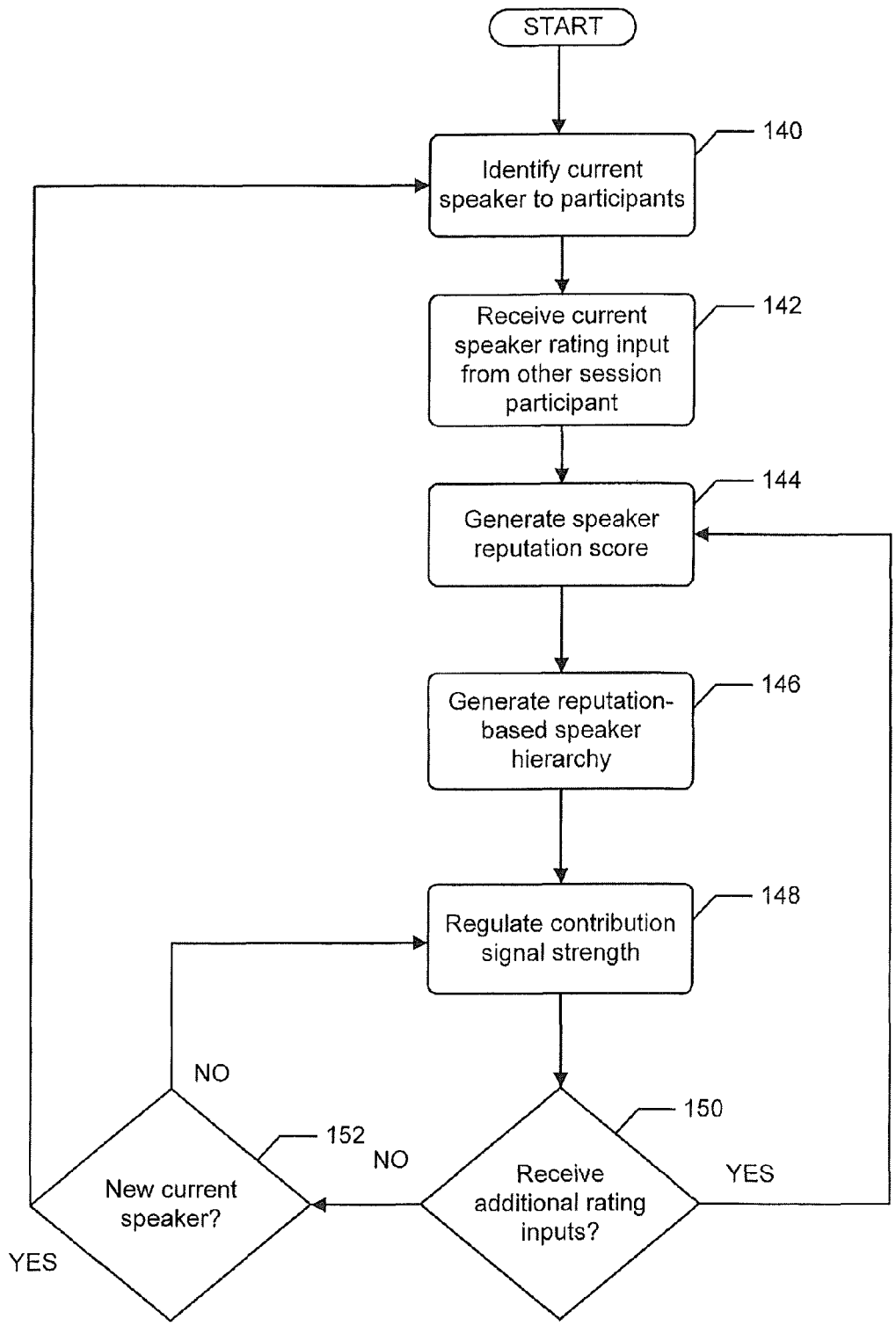
FIG. 2 is a diagram of operations that may be performed by various elements disclosed herein to control a multiple participant communication session according to some embodiments described herein.

Reference is now made to FIG. 2, which is a diagram of operations that may be performed to control a multiple participant communication session according to some embodiments described herein. In the context of a conference call and/or a video conference, the current speaker may optionally be identified to other ones of the participants in the communication session (block 140). A current speaker rating input is received from at least one of the participants (block 142). The speaker rating input may correspond to the helpfulness and/or favorability of the current speaker as determined by any or all of the other participants. In the case of a conference telephone call, the speaker rating input may include a discrete input via a telephone keypad that indicates either a favorable indication or an unfavorable indication of the current speaker's communication.

A speaker reputation score may be generated responsive to receiving the speaker rating input (block 144). The speaker reputation score may be session specific or may include historical data accumulated during prior communication sessions. A reputation-based speaker hierarchy is generated for the participants using each speaker's reputation score (block 146). The reputation-based speaker hierarchy may be generated by ranking the participants based on a comparison of their respective speaker reputation scores. A contribution signal strength of the participants may be regulated to be positively correlated with the reputation-based speaker hierarchy (block 148). The contribution signal strength may refer to a speaker's ability to provide communications to other participants. For example, contribution signal strength embodiments may include the output volume of a speaker's audio signal, time of un-muted interactions, and/or priority to interrupt other participants or not be interrupted by other participants.

Some embodiments provide that new, additional and/or modified speaker rating inputs may be received by the same and/or other participants at different times. In this regard, it is determined as to whether additional rating inputs are received (block 150). If additional rating inputs are received, then the speaker reputation score is generated/revised (block 144), the reputation-based speaker hierarchy is generated/revised (block 146) and the contribution signal strength is regulated using the revised hierarchy (block 148). If additional rating inputs are not received, it is determined if there is a new current speaker (block 152). If no new speaker is determined, then the contribution signal strength continues to be regulated using the reputation-based speaker hierarchy (block 148). If a new current speaker is determined, then the operations according to blocks 140-150 are repeated. To prevent a participant from dominating and/or skewing the speaker reputation score, some embodiments provide that only the most recent of multiple rating inputs from the same participant may be used to generate and/or revise the speaker reputation score. Some embodiments provide that multiple inputs from the same participant may be averaged for generating and/or revising the speaker reputations score.

Figure 3:
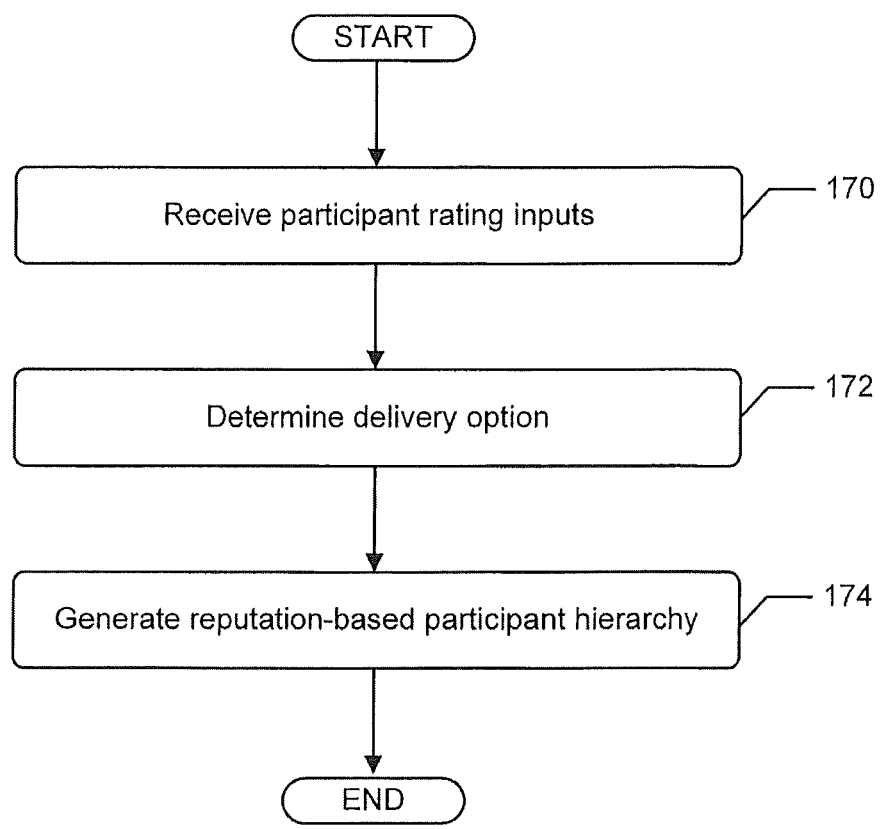
FIG. 3 is a diagram of operations that may be performed by various elements disclosed herein to regulate communications from participants in a multiple participant communication environment according to some embodiments described herein.

Reference is now made to FIG. 3, which is a diagram of operations that may be performed by various elements disclosed herein to regulate communications from participants in a multiple participant communication environment according to some embodiments described herein. Participant rating inputs that are associated with a participant in the communication environment are received (block 170). The participant rating inputs may correspond to a first communication from the participant. A delivery option corresponding to a second communication from the participant is determined based on a value corresponding to the participant rating inputs. For example, if the communications environment is a text-based environment, then determining a delivery option may include determining which one of multiple text message repositories to deliver the second communication based on the participant rating inputs received responsive to the first communication. If the communications environment includes a telephonic and/or video conference call and the second communication includes an audio signal, determining the delivery option may include adjusting a volume of the audio signal corresponding to the participant rating inputs.

In some embodiments, a reputation-based participant hierarchy is generated for the participants using the participant rating inputs (block 174). As such, the delivery option may be determined based on the reputation-based hierarchy.

Use Case Example

Feedback

Figure 4:
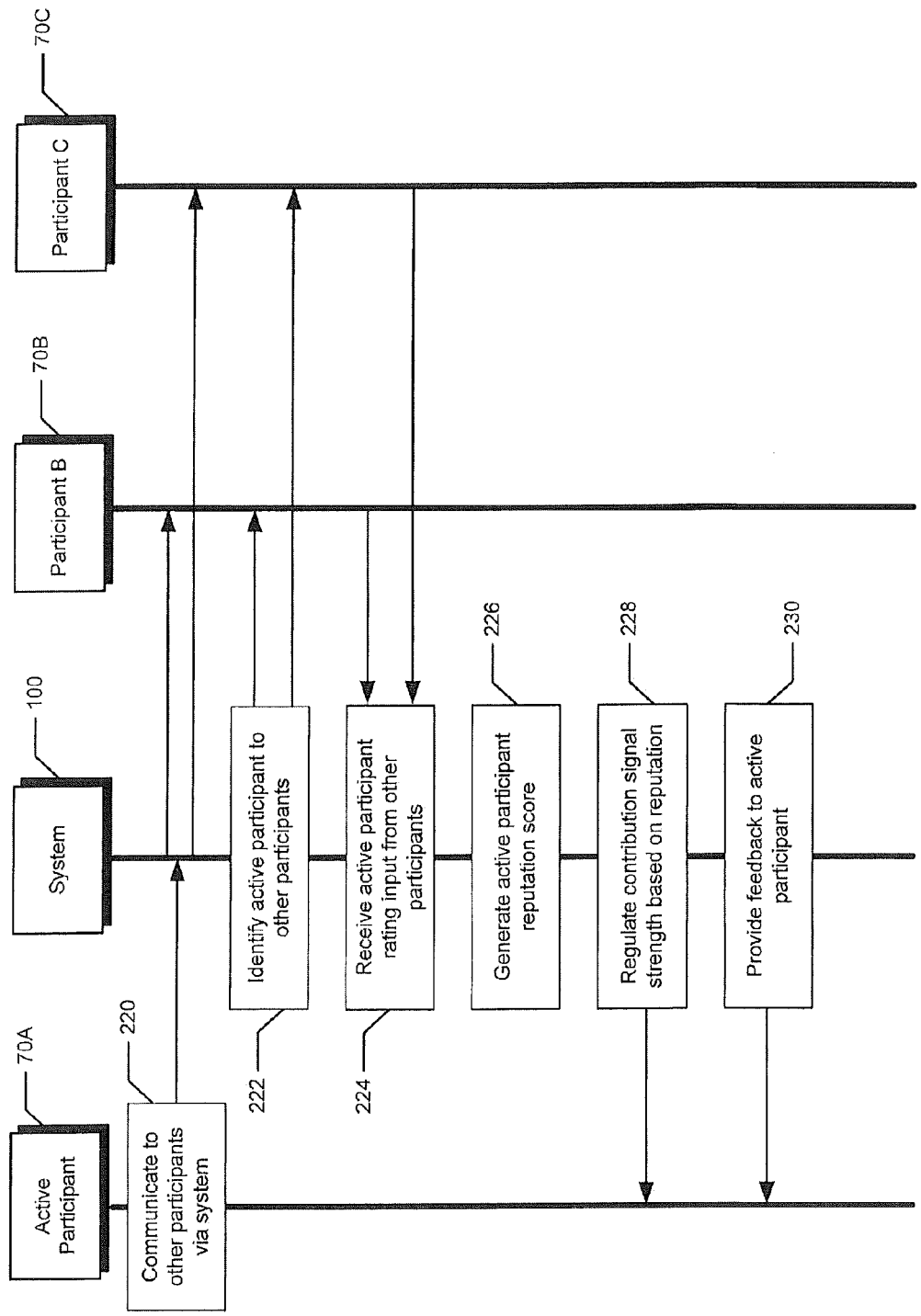
FIG. 4 is a flowchart of operations that may be performed to control a multiple participant communication session according to some embodiments described herein.

Reference is now made to FIG. 4, which is a flowchart of operations that may be performed to control a multiple participant communication session according to some embodiments described herein. The communication session may be supported by a system 100 (see FIG. 1) that is configured to provide a communication route between multiple participants. An active participant 70A sends a communication to other participants 70B and 70C via the system 100 (block 220). The system 100 may identify the active participant 70A to the other participants 70B and 70C (block 224). The system receives an active participant rating input from at least one of the other participants 70B and 70C (block 224). The system 100 or a related component thereof generates an active participant reputation score (block 226). The contribution signal strength is regulated based on the reputation score (block 228). Feedback may be provided to the active participant (block 230). Some embodiments provide that a tone, audible signal or graphical signal or indication may be provided to the active speaker to indicate the reputation score and/or the receipt of a rating input. For example, if the active participant is providing significantly helpful content, the feedback may be provided to encourage the active participant to continue. In contrast, feedback may also be provided that signals to the active participant that the current content of communications is less helpful. In this manner, behavior modification of the active speaker may be encouraged. The active speaker may optionally be provided the identity of a participant that provides the feedback.

Use Case Example

Delivery Option

Figure 5:
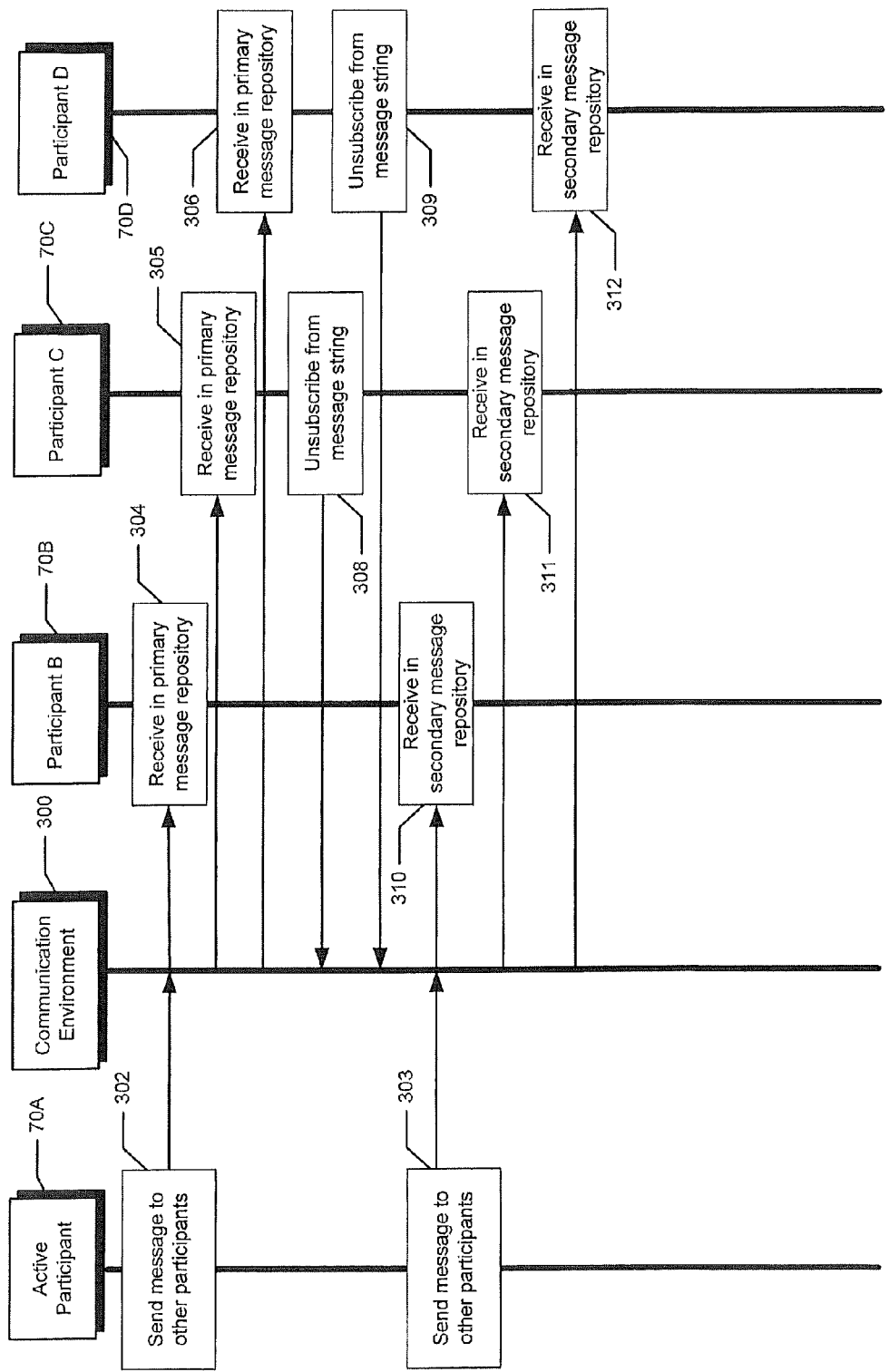
FIG. 5 is a flowchart of operations that may be performed to control a multiple participant communication session according to further embodiments described herein.

Reference is now made to FIG. 5, which is a flowchart of operations that may be performed to control a multiple participant communication session according to some embodiments described herein. The communication session may be supported by a communication environment 300 that is configured to provide a communication route between multiple participants. An active participant 70A sends a message to other participants 70B, 70C and 70D via the communication environment 300 (block 302). Participants 70B, 70C and 70D each receive the message in a primary repository (blocks 304-306). Some embodiments provide that the primary repository may include an inbox or other designated repository for receiving messages. Participants 70C and 70D unsubscribe from the message and/or from a subsequent message that is generated from the message (blocks 308-309). Participant 70B does not unsubscribe from the message or messages. The active participant 70A sends another message to the participants 70B, 70C and 70D via the communication environment 300. Participant 70B receives the second message in the primary repository (block 310). Based on the unsubscribe messages corresponding to the message string of the earlier message, participants 70C and 70D receive the message in a secondary message repository (blocks 311-312). Additionally, some embodiments provide that a group dynamic filter may be applied to subsequent messages based on rating inputs (unsubscribe messages) from a portion of the groups of participants. In such embodiments, a non-responding participant, such as participant 70B, may receive the second or subsequent message in a secondary message repository (block 310) by virtue of the rating inputs provided by other participants.

Although discussed in the context of one or more unsubscribe messages causing subsequent messages to be delivered to a secondary repository, rating inputs and/or activities that indicate a particularly helpful, useful and/or valuable message may serve to cause the group dynamic filter to have messages delivered to a higher priority message repository. Although discussed in the context of two message repositories, participants may have more than two different message repositories. In some embodiments, the operation of unsubscribing may include a rating and/or a categorization component that defines which of multiple repositories should receive subsequent messages from the active participant 70A.

Use Case Example

Session Leader

Figure 6:
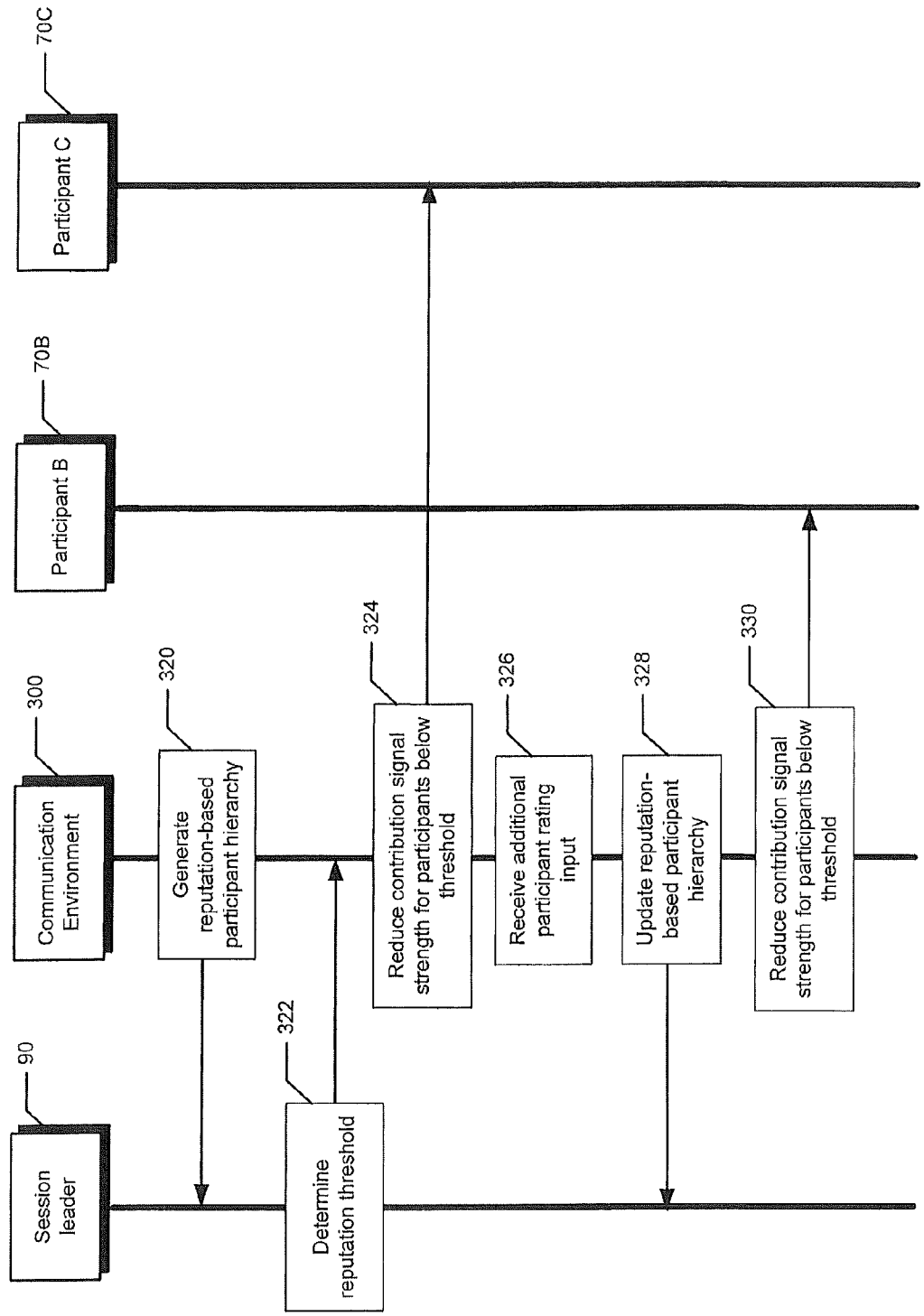
FIG. 6 is a flowchart of operations that may be performed to control a multiple participant communication session according to still further embodiments described herein.

Reference is now made to FIG. 6, which is a flowchart of operations that may be performed to control a multiple participant communication session according to some embodiments described herein. The communication session may be supported by a communication environment 300 that is configured to provide a communication route between multiple participants that includes a communication session leader 90.

The session leader 90 may be responsible for organizing, hosting and/or managing the communication session. Receipt of the rating data and generation of the reputation scores of the participants is discussed above with respect to, for example, FIG. 4, and thus is omitted from this discussion and operations start where a reputation-based participant hierarchy is generated and sent to the session leader 90 (block 320). The session leader 90 may determine a reputation threshold (block 322).

Some embodiments provide that a graphical user interface corresponding to a computer-based communication application is generated. For example, the leader 90 may access the communication environment 300 via a graphical user interface. The graphical user interface may include a central status output component that is operable to be displayed to the communication session leader and that includes reputation scores for the session participants 70B and 70C. The graphical user interface may also include a threshold input component for the session leader to provide the reputation threshold. The graphical user interface may be provided to some or all of the participants and the session leader and may include an input component that is operable to receive the participant rating inputs.

Once the reputation threshold is determined, the contribution signal strength may be reduced for participants 70C that have a reputation score below the reputation threshold (block 324). Additional participant rating inputs may be received (block 326) and the reputation-based participant hierarchy may be updated and provided to the session leader 90 (block 328). As a result of the updated reputation-based participant hierarchy, the contribution signal strength may be reduced for additional participants 70B that have a reputation score below the reputation threshold (block 330). In this manner, the session leader 90 may set the threshold to allow participants that have reputations as being more helpful, even if only in the context of the current communication content, to be given higher priority over those rated to be less helpful.

Example Reputation Hierarchy Table

Figures 7, 8:
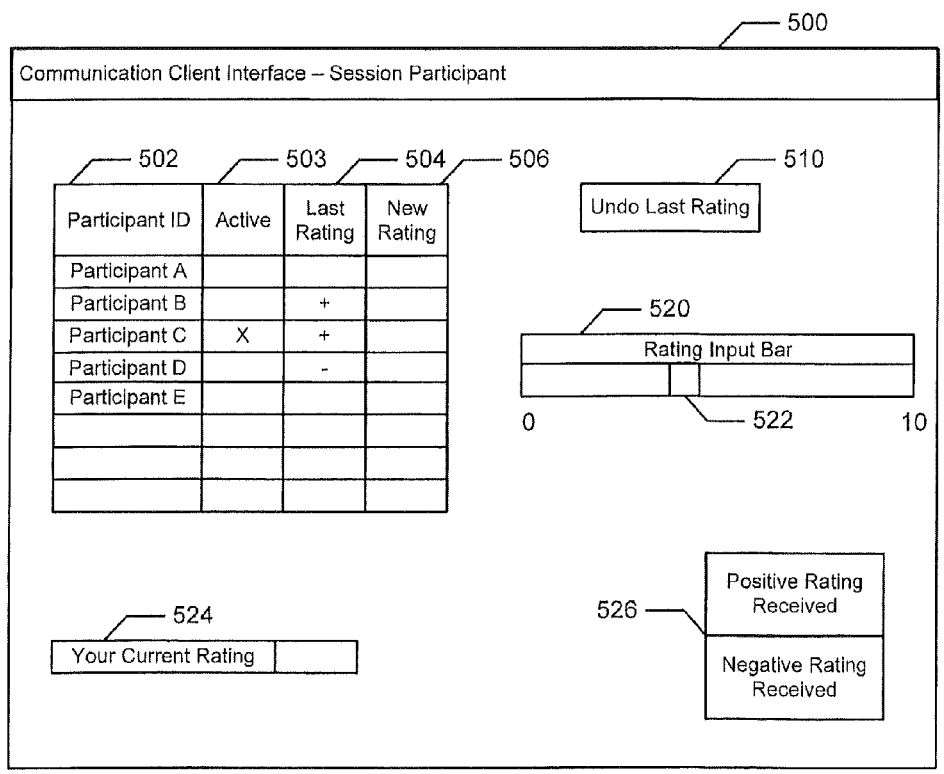
FIG. 7 is a table illustrating values and signal strengths in a reputation-based hierarchy according to some embodiments described herein.
FIG. 8 is a block diagram illustrating a session participant graphical user interface according to some embodiments described herein.

Reference is now made to FIG. 7, which is a table illustrating values and signal strengths in a reputation-based hierarchy according to some embodiments described herein. The table includes columns identifying the participants A-E 402, the reputation scores for each participant 404 and the signal strengths of the participants for the case where each of the different participants A-E is the active participant 406A-406E. Referring to column 406A in which participant A is the active participant, note that participants B and C have lower reputation scores than participant A and thus have lower contribution signal strengths than participant A. Note that there is no reputation score for participant E and that the corresponding contribution signal strength is unadjusted. Some embodiments may provide that a starting value of reputation is established in the absence of rating input data and that the contribution signal strength is adjusted based on that starting value.

Additionally, note that participant D has a reputation score that is higher than that of participant A, but the contribution signal strength is the same. In some embodiments, the contribution signal strength of participant D would be increased to a maximum value in the range of possible values that would be higher than that of participant A's contribution signal strength.

Referring to column 406B in which participant B is the active participant, note that participants A and C-E all have higher reputation scores than participant B and thus have higher contribution signal strengths than participant B. Additionally, referring to column 406D in which participant D is the active participant, note that participants A, B and C all have lower reputation scores than participant D and thus have lower contribution signal strengths than participant D.

Graphical User Interface

Reference is now made to FIG. 8, which is a block diagram illustrating a session participant graphical user interface according to some embodiments described herein. The graphical interface 500 for a session participant may be provided in conjunction with and/or as a component of a computer-based communication client application. A list of session participant identities 502 may be provided. Additionally, an indication of which participant is active 503 may be provided. Although illustrated as a check box, the active indicator may be a separate field in the interface and/or a modification, bolding, underlining and/or highlighting of the participant identity. An indication of the last participant rating input 504 may be displayed. Additionally, one of more fields for providing a new participant rating 506 may be provided.

In some embodiments, a button to undo a recent rating 510 may be provided. The recent rating may correspond to the last rating provided either for the active participant or a different participant that may be selected. Some embodiments provide that a graphical input component 520 such as a rating input bar that may include a slider 522 that may be positioned along a scale to provide the participant rating. An indication of received rating data 526 may be provided. The received rating data 526 may be provided as positive and/or negative or may be provided without indication of the value. Some embodiments provide that the current rating 524 may be provided.

Figure 9:
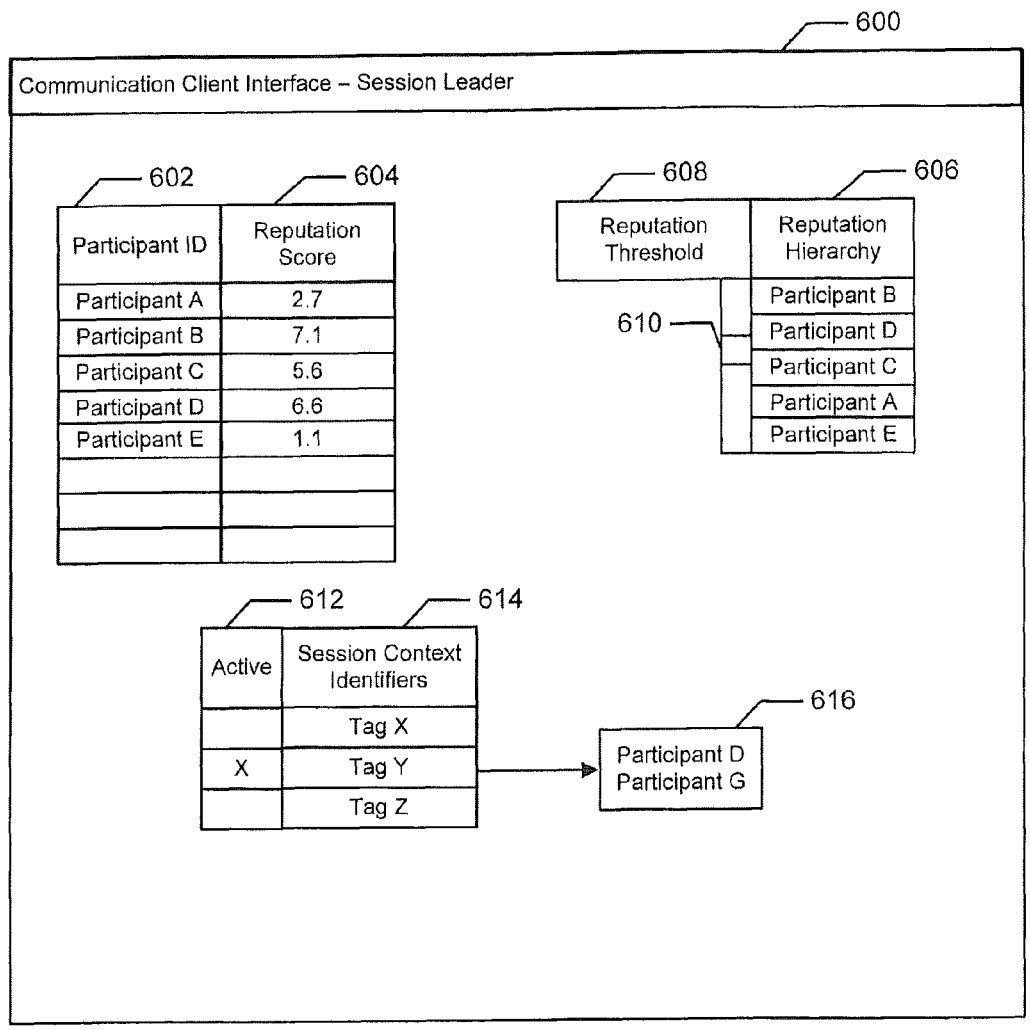
FIG. 9 is a block diagram illustrating a session leader graphical user interface according to some embodiments described herein.

Reference is now made to FIG. 9, which is a block diagram illustrating a session leader graphical user interface according to some embodiments described herein. The graphical interface 600 for a session participant may be provided in conjunction with and/or as a component of a computer-based communication client application. A list of session participant identities 602 may be provided. Reputation scores of each of the participants 604 may be displayed. The reputation-based hierarchy 606 that ranks the participants according to reputation scores may be displayed. In some embodiments, a reputation threshold graphical input component 608 may be provided. For example, a slider may be positioned relative to the reputation-based hierarchy 606 to determine which participants may have their contribution signal strengths adjusted.

In some embodiments, session context identifiers 614 may be displayed. For example, the communication session may be associated with one or more tags that define and/or identify a context for the communication content. A context identifier active indicator 612 may be provided to identify which of the context identifiers is currently active. Additionally, a context specific list of participants 616 may be displayed responsive to identifying which of the contexts are active. In this manner, the session leader can ensure that the relevant participants are provided with adequate contribution signal strength to provide meaningful communications. Although not illustrated, the session leader graphical user interface 600 may include options for overriding otherwise predetermined regulation provided by the systems and methods herein.

Various embodiments have been described fully herein with reference to the accompanying figures, in which various embodiments are shown. This disclosure may, however, be embodied in many alternate forms and should not be construed as limited to the embodiments set forth herein.

Accordingly, while the disclosure is susceptible to various modifications and alternative forms, specific embodiments thereof are shown by way of example in the drawings and were described in detail herein. It should be understood, however, that there is no intent to limit the disclosure to the particular forms disclosed, but on the contrary, the disclosure is to cover all modifications, equivalents, and alternatives falling within the spirit and scope of the disclosure as defined by the claims. Like numbers refer to like elements throughout the description of the figures.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises," "comprising," "includes," "including," "have," "having" or variants thereof when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Moreover, although some of the diagrams include arrows on communication paths to show a primary direction of communication, it is to be understood that communication may occur in the opposite direction to the depicted arrows.

Various embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the present disclosure may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the disclosure and, although specific terms are employed, they are used in a generic and descriptive sense only and not for purposes of limitation, the scope of the disclosure being set forth in the following claims.

The invention claimed is:

1. A method for controlling a multiple participant communication session, the method comprising:
   identifying a current speaker to other ones of a plurality of participants in the multiple participant communication session;
   receiving a speaker rating input from at least one of the plurality of participants that corresponds to a helpfulness of the current speaker and at least one of a plurality of communication contexts;
   generating a plurality of speaker reputation scores responsive to receiving the speaker rating input, individual ones of the speaker reputation scores corresponding to at least one of the communication contexts;
   generating a reputation-based speaker hierarchy for the plurality of participants using at least one of the speaker reputation scores; and
   regulating a contribution signal strength corresponding to ones of the plurality of participants that is positively correlated with the reputation-based speaker hierarchy;
   regulating a relative communication output from ones of the plurality of participants based on the plurality of speaker reputation scores and based on the at least one of the communication contexts or a change in the at least one of the communication contexts, the at least one of the communication contexts being identified by at least one context tag; and
   wherein at least one of identifying the current speaker, receiving the speaker rating input, generating the speaker reputation scores, generating the reputation-based speaker hierarchy, regulating the contribution signal strength and regulating the relative communication output are performed using at least one processor.

2. The method according to claim 1, wherein the multiple participant communication session is a conference telephone call, and wherein receiving the speaker rating input comprises receiving a discrete input via a telephone keypad.

3. The method according to claim 1, wherein generating the reputation-based speaker hierarchy comprises ranking the plurality of participants based on a comparison of their respective speaker reputation scores, and wherein regulating the contribution signal strength comprises adjusting corresponding volumes of a plurality of transmitted audio signals or a plurality of received audio signals from the plurality of participants as a function of the respective speaker reputation scores.

4. The method according to claim 1, further comprising:
   receiving a modified speaker rating input from the at least one of the plurality of participants that corresponds to a change in the helpfulness of the current speaker;
   revising the speaker reputation scores responsive to receiving the modified speaker rating input; and
   revising the reputation-based speaker hierarchy for the plurality of participants using the speaker reputation scores.

5. A computer program product for controlling the multiple participant communication session, the computer program product comprising a computer-readable medium having computer-readable program code executable by a processor, the computer-readable program code being configured to perform the method of claim 1.

6. A system for rating a plurality of participants in a multiple participant communication session, the system comprising:
   a participant reputation score generator that is operable to generate a plurality of participant reputation scores of ones of a plurality of participants in the multiple participant communication session responsive to rating data provided by other ones of the plurality of participants, wherein individual ones of the participant reputation scores correspond to at least one communication context;
   a participant output control module that is operable to regulate relative communication output from ones of the plurality of participants based on the participant reputation scores; and
   wherein the multiple participant communication session is associated with at least one context tag that identifies the at least one communication context, and wherein the participant output control module dynamically regulates the relative communication output from ones of the plurality of participants based on the participant reputation scores and based on the at least one communication context or a change in the at least one communication context.

7. The system according to claim 6, further comprising an active participant identification module that is operable determine an active participant identification and to transmit the active participant identification to other ones of the plurality of participants, wherein the participant reputation score generator is further configured to associate a corresponding one of the participant reputation scores with the active participant identification.

8. The system according to claim 7, wherein the rating data includes a discrete indication that one of the plurality of participants identified by the active participant identification is helpful or that the one of the plurality of participants identified by the active participant identification is unhelpful.

9. The system according to claim 7, wherein the participant output control module is operable to regulate the relative communication output from ones of the plurality of participants based on the participant reputation scores by establishing a reputation hierarchy that ranks the participant reputation scores of the plurality of participants and to mute a lower ranked participant relative to an upper ranked participant for a first muting time interval.

10. The system according to claim 9, wherein if, after the first muting time interval expires, the respective one of the participant reputation scores of the lower ranked participant is further lowered, the lower ranked participant is muted for a second muting time interval that is longer than the first muting time interval.

11. The system according to claim 7, wherein the participant output control module is operable to regulate the relative communication output from ones of the plurality of participants based on the participant reputation scores by establishing a reputation hierarchy that ranks the participant reputation scores of the plurality of participants and to adjust a relative output volume level for ones of the plurality of participants corresponding to the reputation hierarchy.

12. The system according to claim 6, wherein the participant output control module is operable to regulate the relative communication output from ones of the plurality of participants based on the participant reputation scores by establishing a threshold participant reputation score and by adjusting a relative output volume level for ones of the plurality of participants corresponding to a comparison relative to the threshold participant reputation score.

13. The system according to claim 6, wherein the multiple participant communication session comprises a video conference.

14. The system according to claim 6, wherein the multiple participant communication session includes a text-based communication environment, and wherein the relative communication output is regulated by modifying an appearance of a text corresponding to ones of the plurality of participants.

15. The system according to claim 6, wherein an active participant identification includes a persistent participant identifier, a respective one of the participant reputation scores being associated with the persistent participant identifier; and
wherein the respective one of the participant reputation scores is determined based at least in part on a previously determined participant reputation score that was generated responsive to at least one previously occurring communication session.

16. The system according to claim 6, wherein at least one of the participant reputation scores includes at least one tag that corresponds to the at least one communication context in which the corresponding one of the plurality of participants has been helpful.

17. The system according to claim 16, wherein the participant output control module regulates the relative communication output from ones of the plurality of participants based on the participant reputation scores and the at least one communication context that corresponds to the at least one tag included in the corresponding one of the participant reputation scores.

18. The system according to claim 16, further comprising a participant list generator that is operable to identify a plurality of communication participants to be invited to a planned communication session based on the at least one tag associated with at least one of the participant reputation scores.

19. The system according to claim 6, wherein the participant reputation scores include a statistical component having a value that is weighted with recently received rating data that includes a greater statistical significance than earlier received rating data.

20. The system according to claim 19, wherein the statistical component includes an exponentially weighted moving average of the recently received rating data.

21. The system according to claim 6, further comprising a feedback module that is operable to provide a rating data feedback signal to an active participant.

22. The system according to claim 21, wherein the rating data feedback signal includes a visual indication or an audible indication.

23. A computer program product for regulating participation in a multiple participant communication session, the computer program product comprising a non-transitory computer-readable medium having computer-readable program code executable by a computer, the computer-readable program code comprising:
code that is configured to identify an active participant of a plurality of participants in the multiple participant communication session;
code that is configured to generate a participant reputation score responsive to receiving a participant rating input from at least one other of the plurality of participants, the participant rating input corresponding to a helpfulness of the active participant and a communication context associated with a subject being discussed in the multiple participant communication session;
code that is configured to regulate a contribution signal strength corresponding to the active participant relative to other ones of the plurality of participants that is correlated with the participant reputation score; and
code that dynamically regulates a relative communication output from ones of the plurality of participants based on the participant reputation scores and based on the communication context or a change in the communication context, the communication context being identified by at least one context tag.

24. The computer program product according to claim 23, further comprising code that is configured to generate a graphical user interface corresponding to a computer-based communication application, wherein the graphical user interface includes an input component that is operable to receive the participant rating input.

25. The computer program product according to claim 24, wherein the participation reputation score comprises a plurality of participation reputation scores, wherein the graphical user interface further includes a central status output component that is operable to be displayed to a communication session leader and that includes the participant reputation scores associated with ones of the plurality of participants.

26. The computer program product according to claim 24, wherein the graphical user interface further includes a central control component that is operable to regulate the contribution signal strengths associated with ones of the plurality of participants.

27. The computer program product according to claim 24, wherein the graphical user interface further includes a participant reputation output component that is operable to be displayed to one of the plurality of participants and that includes the respective one of the participant reputation scores associated with the one of the plurality of participants.

28. The computer program product according to claim 24, wherein the input component that is operable to receive the participant rating input includes a graphical scale than is modified to provide the participant rating input.

29. A method for regulating communications from a plurality of participants in a multiple participant communication environment, the method comprising:
receiving a plurality of participant rating inputs that are associated with a first participant of the plurality of participants responsive to a first communication from the first participant, the first communication associated with a context specific component, at least one of the participant rating inputs including at least one context tag that corresponds to at least one specific context in which the first participant of the plurality of participants has been helpful;
determining a delivery option corresponding to a second communication from the first participant based on at least one of a plurality of participant reputation scores corresponding to the participant rating inputs that are associated with the first participant; and
regulating a relative communication output from ones of the plurality of participants based on the plurality of participant reputation scores and based on the communication context or a change in the communication context, the communication context being identified by the at least one context tag.

30. The method according to claim 29, wherein the multiple participant communication environment includes a text-based environment and wherein determining the delivery option comprises determining which one of a plurality of text message repositories to deliver the second communication based on the participant rating inputs received responsive to the first communication based on a group dynamic filter that may determine the delivery option for a group of the plurality of participants based on the participant rating inputs received by less than the group of the plurality of participants.

31. The method according to claim 29, wherein the multiple participant communication environment includes a telephonic conference call, wherein the second communication includes an audio signal, and wherein determining the delivery option comprises adjusting a volume of the audio signal corresponding to the participant rating inputs.

32. The method according to claim 29, further comprising generating a reputation-based participant hierarchy for the plurality of participants using the participant rating inputs, wherein determining the delivery option comprises using the reputation-based hierarchy to determine the delivery option.

33. The method according to claim 29, further comprising providing a rating data feedback signal to an active participant.

\* \* \* \* \*